(12) United States Patent
Fritz et al.

(10) Patent No.: US 10,272,955 B2
(45) Date of Patent: Apr. 30, 2019

(54) MOTOR VEHICLE BODY

(71) Applicant: GM GLOBAL TECHNOLOGY OPERATIONS LLC, Detroit, MI (US)

(72) Inventors: Georg Fritz, Ruesselsheim (DE); Jens Hartmann, Ruesselsheim (DE); Matthias Graffe, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 9 days.

(21) Appl. No.: 15/597,743

(22) Filed: May 17, 2017

(65) Prior Publication Data
US 2017/0334487 A1 Nov. 23, 2017

(30) Foreign Application Priority Data

May 19, 2016 (DE) .................. 10 2016 006 195

(51) Int. Cl.
*B62D 25/20* (2006.01)
*B62D 25/04* (2006.01)
*B62D 25/02* (2006.01)
*B62D 27/02* (2006.01)
*B62D 21/15* (2006.01)

(52) U.S. Cl.
CPC ....... *B62D 25/2036* (2013.01); *B62D 21/157* (2013.01); *B62D 25/025* (2013.01); *B62D 25/04* (2013.01); *B62D 27/02* (2013.01)

(58) Field of Classification Search
CPC .. B62D 25/2036; B62D 25/025; B62D 25/04; B62D 21/157; B62D 27/02
USPC ................................................... 296/187.12
See application file for complete search history.

(56) References Cited

U.S. PATENT DOCUMENTS

| 8,007,032 | B1 | 8/2011 | Craig | |
| 8,292,356 | B2 | 10/2012 | Ishigame et al. | |
| 8,646,833 | B2 * | 2/2014 | Fujii | B62D 21/157 |
| | | | | 296/187.08 |
| 9,022,152 | B2 * | 5/2015 | Imamura | B62D 21/157 |
| | | | | 180/68.5 |

(Continued)

FOREIGN PATENT DOCUMENTS

JP    H09193837 A    7/1997

OTHER PUBLICATIONS

German Patent Office, German Search Report for German Application No. 102016006195.2, dated Jun. 15, 2017.

*Primary Examiner* — Joseph D. Pape
*Assistant Examiner* — Dana D Ivey
(74) *Attorney, Agent, or Firm* — Lorenz & Kopf, LLP

(57) ABSTRACT

A motor vehicle body includes a side sill and a pillar arranged on the side sill, which has a cross section with a first side and a following second side in a vehicle longitudinal direction. A cross member is attached to the side sill. A sill-side end section of the cross member includes a side wall following a first side wall of the end section in the vehicle longitudinal direction. The distance of the first side wall in the vehicle longitudinal direction towards the second side of the cross section of the pillar decreases in a vehicle transverse direction towards the side sill at least locally in regions. An upper cover wall is connected to a connection section of the cross member. The distance of the upper cover wall decreases in a vehicle vertical direction towards the pillar in the vehicle transverse direction at least locally in regions.

14 Claims, 2 Drawing Sheets

(56) References Cited

U.S. PATENT DOCUMENTS 9,108,682 B2    8/2015   Mori
2011/0227368 A1    9/2011   Craig

* cited by examiner

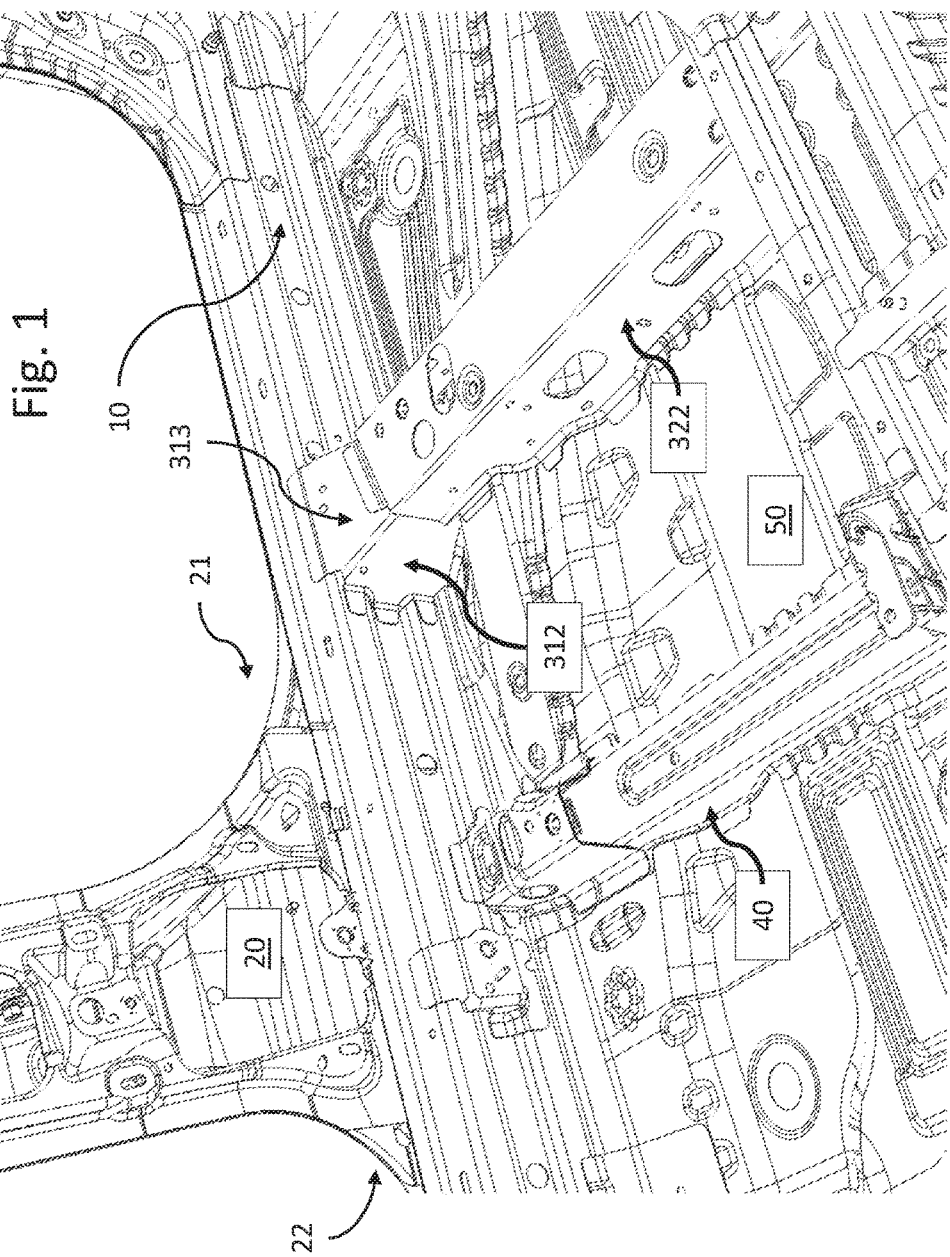

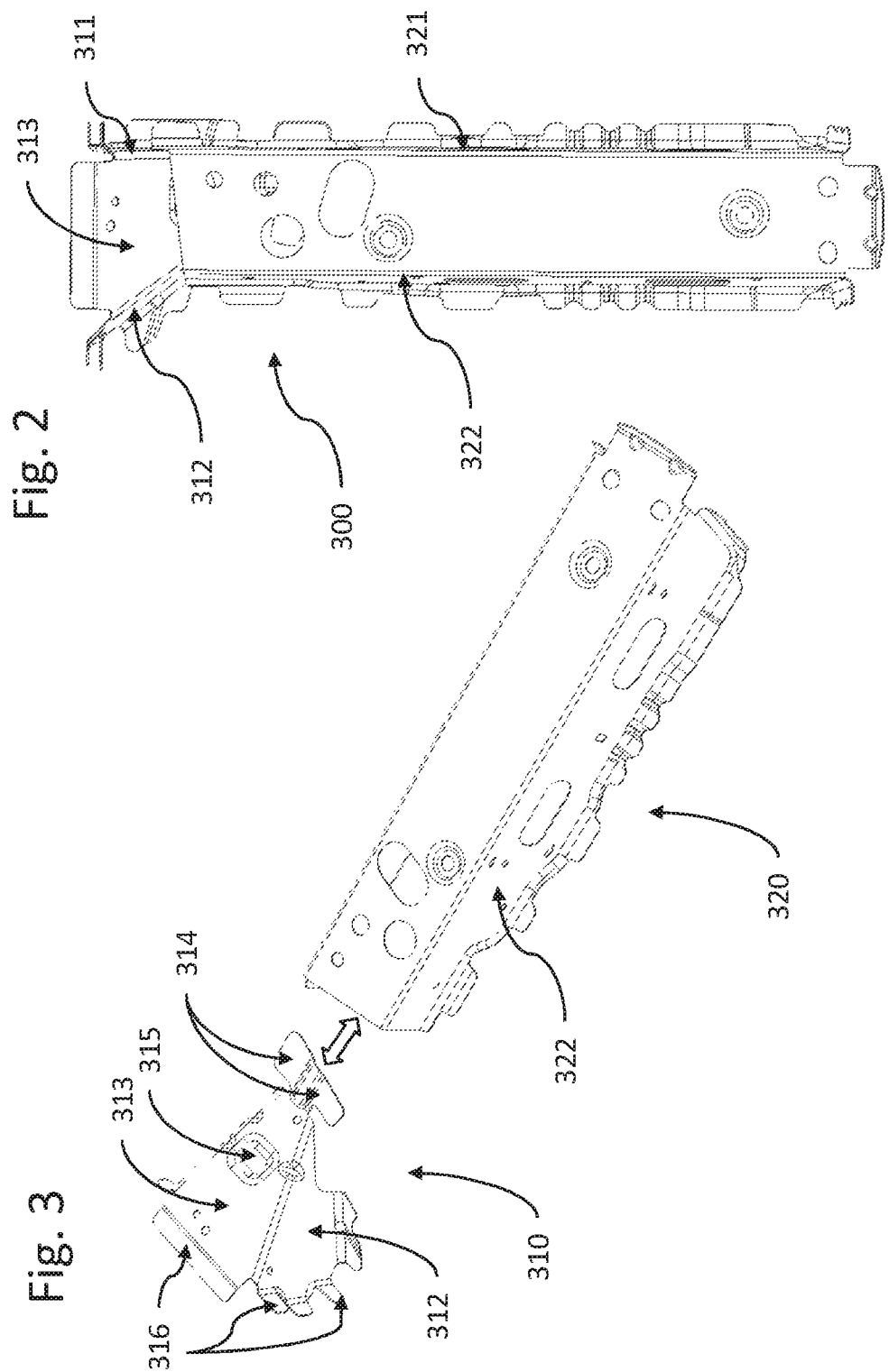

MOTOR VEHICLE BODY

CROSS-REFERENCE TO RELATED APPLICATION

This application claims priority to German Patent Application No. 102016006195.2, filed May 19, 2016, which is incorporated herein by reference in its entirety.

TECHNICAL FIELD

The present disclosure relates to a motor vehicle body and to a passenger car with the motor vehicle body and to a method for producing the motor vehicle body.

BACKGROUND

US 2011/0227368 A1 discloses a motor vehicle energy distribution side structure or body with a side sill, a pillar attached on the side sill and a cross member for absorbing and transferring an impact stress of side sill and pillar.

SUMMARY

According to an embodiment of the present disclosure, a motor vehicle body, in particular for a passenger car, includes at least one inner or vehicle-inside side-sill member or simply side sill, at least one pillar arranged on the side-sill and one cross member attached to the side sill. The pillar can, in an embodiment, be a middle (vertical) pillar, in particular a B-pillar and/or form an angle with a vehicle vertical direction or axis, which in a further development amounts to a maximum of 45°. In particular with middle (vertical) pillars, the discharge of (lateral) impact forces is of high importance. In an embodiment, a main extension direction, in particular middle axis, of the cross member forms an angle with a vehicle transverse direction or axis, which amounts to a maximum of 30°, preferably a maximum of 10°, and particularly at least substantially parallel to the vehicle transverse direction. Such a cross member can, in an embodiment, advantageously support or absorb impact forces on the pillar and/or the side sill.

In an embodiment, the pillar is produced integrally with the side sill or, connected to the side sill in a firmly bonded manner, in particular welded, soldered and/or glued. In an embodiment, the pillar, side sill and/or cross member are at least partly produced from metal. In an embodiment, the strength of the side structure in the event of a lateral impact can be improved as a result.

According to an embodiment of the present disclosure, the pillar includes (at least) one cross section, in particular a sill-adjacent or lowermost cross section, (perpendicularly to the vehicle vertical direction) with a first side edge in a vehicle longitudinal direction and a second side edge following in this vehicle longitudinal direction.

According to an embodiment of the present disclosure, a sill-side end section of the side member includes a first side wall in this vehicle longitudinal direction and a following second side wall in this vehicle longitudinal direction.

In an embodiment, the vehicle longitudinal direction is directed or orientated from a vehicle front to a vehicle rear. Accordingly, the first side of the cross section can in particular be a front side edge, and the second side of the cross section is a rear side edge following in the vehicle longitudinal direction the front side edge.

In another embodiment, the vehicle longitudinal direction is conversely directed or orientated from vehicle rear to vehicle front and accordingly the first side of the cross section, in this vehicle longitudinal direction is a rear side edge, and the second side of the cross section following in this vehicle longitudinal direction accordingly is a front side edge.

According to an embodiment of the present disclosure, a minimal, maximal and/or average distance in the vehicle longitudinal direction measured from the second side wall of the end section to the second side of the cross section of the pillar in a vehicle transverse direction to the side sill decreases at least locally in regions.

In particular, the end section in an embodiment includes at least one first cross section perpendicularly to the vehicle transverse direction and a second cross section perpendicularly to the vehicle transverse direction which in the vehicle transverse direction is or lies nearer to the pillar or the side sill or further on the vehicle outside. A tangent on the first cross section in the vehicle longitudinal direction that is nearest to the second side of the cross section of the pillar and parallel to the vehicle vertical direction is more distant from the second side of the cross section of the pillar than a tangent on the second cross section that is nearest to the second side of the cross section of the pillar and parallel to the vehicle vertical direction, in particular by at least 0.5 cm and/or maximally 10 cm. As a result, a transfer or introduction or passing-on of impact forces from the pillar to or into the cross member can be improved in an embodiment and thus in a further development in particular a loading of the side sill reduced.

Additionally or alternatively, the sill-side end section of the cross member includes, an upper cover wall in a vehicle vertical direction (from a vehicle floor towards a vehicle roof) having minimal, maximal and/or average distance measured in the vehicle vertical direction to the pillar (in particular a transition to the side sill or a pillar-side upper edge of the side sill) decreases in the vehicle transverse direction towards the side sill at least locally in regions.

In particular, the end section, in an embodiment, includes at least one first cross section perpendicularly to the vehicle transverse direction and a second cross section perpendicularly to the vehicle transverse direction, which in the vehicle transverse direction of the pillar or the side sill is or lies nearer or further on the vehicle outside. A pillar-next tangent on the first cross section in the vehicle vertical direction that is parallel to the vehicle longitudinal direction is further distant from the pillar than a pillar-next tangent on the second cross section that is parallel to the vehicle longitudinal direction, in particular by at least 0.1 cm and/or maximally 5 cm. As a result, a transition or introduction or passing-on of impact forces from the pillar onto or into the cross member is improved and thus in an embodiment a loading of the side sill may be further reduced.

Additionally or alternatively, the sill-side end section of the cross member is connected with a connection section of the cross member which in an embodiment is produced separately from the end section, or in a further development in one piece. As a result, a production and/or connection of the cross member to the side sill can be improved in an embodiment, in particular of a cross member with an aforementioned end section with second side and/or upper cover wall running towards the pillar.

The sill-side end section of the cross member includes or contains in an embodiment its sill-side end face and/or includes an extent in the vehicle transverse direction which amounts to at least 5%, preferably at least 10%, and/or maximally 50%, particularly maximally 40%, and particularly maximally 30% of an overall extent of the cross member and/or an extent of the connection section in the vehicle transverse direction. In an embodiment, the distance of the second side and/or upper cover wall decreases at least following the connection section at least in regions and/or to at least 20%, in preferably at least 50%, particularly at least 80% of a length of the end section in the vehicle transverse direction and, more particularly the overall length of the end section or of the length of the part of the end section protruding from the connection section. Additionally or alternatively in an embodiment, a second side wall in the vehicle longitudinal direction and/or an upper cover wall in the vehicle vertical direction of a section that integrally follows the end section or a connection section of the cross member that is connected to the end section, runs at least substantially parallel to the vehicle transverse direction. As a result, a transfer or introduction or passing-on of impact forces from the pillar onto or into the cross member can be further improved and thus in a further development, in particular a loading of the side sill, further reduced.

In an embodiment, the distance of the second side and/or upper cover wall decreases, preferably constantly and/or at least substantially linearly. In particular, the second side and/or upper cover wall, in an embodiment, is formed at least substantially flat. As a result, a transfer or introduction or passing-on of impact forces in an embodiment from the pillar onto or into the cross member can be further improved and thus in a further development in particular a loading of the side sill further reduced. Additionally or alternatively, a production and/or connection of the cross member to the side sill can in an embodiment be thereby further improved.

In an embodiment, a minimal, maximal, and/or average width (measured in the vehicle longitudinal direction) and/or height (measured in the vehicle vertical direction) of a cross section of the end section increases in the vehicle transverse direction towards the side sill at least in regions in particular at least following the connection section at least in regions and/or by minimally at least 20%, at least 50%, preferably at least 80% of a length of the end section in the vehicle transverse direction, and particularly the overall length of the end section or of the length of the part of the end section protruding from the connection section, particularly constantly, and/or at least substantially linearly and/or by at least 10%, particularly at least 20%, and/or maximally 100%, particularly maximally 50%. In an embodiment, a minimal, maximal and/or average width (measured in the vehicle longitudinal direction) of a sill-side face cross section of the end section is greater than the minimal, maximal and/or average width (measured in the vehicle longitudinal direction) of a sill-side face cross section of the connection section, by at least 10%, particularly at least 20%, and/or maximally 100%, particularly maximally 50%. Additionally or alternatively, an minimal, maximal and/or average height (measured in the vehicle vertical direction) of a or the sill-side face cross section of the end section is greater in an embodiment than the minimal, maximal and/or average height (measured in the vehicle vertical direction) of the sill-side face cross section of the connection section, by at least 10%, particularly at least 20%, and/or maximally 100%, particularly maximally 50%. As a result, supporting of impact forces on the pillar and/or the side sill can in an embodiment be improved by the cross member.

In an embodiment, the motor vehicle body includes at least one further cross member, in particular a pillar-next cross member. In a further development, the one cross member with the sill-side end section described here is adjacent to this pillar-next cross member, in particular the pillar-next cross member in the vehicle longitudinal direction follows the one cross member with the sill-side section described here. As a result, a supporting of impact forces on the pillar and/or the side sill and/or a deformation or impact in particular side impact characteristic of the motor vehicle body can be improved in an embodiment.

In an embodiment, at least one cross section of the end section perpendicularly to the vehicle transverse direction has a U-shaped profile. In a further development, the second side wall forms a leg and/or the upper cover wall a connection between two legs of the U-profile. In a further development, the end section has a U-profile which diverges in its width towards the side sill. Additionally or alternatively, at least one cross section of the connection section has a U-shaped profile perpendicularly to the vehicle transverse direction in an embodiment. The connection section has a U-profile with at least substantially constant width. As a result, a transfer or introduction or passing-on of impact forces from the pillar onto or into the cross member can, in an embodiment, be further improved and thus in a further development in particular a loading of the side sill further improved. Additionally or alternatively, in an embodiment, a production and/or connection of the cross member to the side sill can thereby be improved.

In an embodiment, the end section engages into the connection section in particular via at least 20% and/or maximally 80% of its overall length (in the vehicle transverse direction). As a result, a transfer or introduction or passing-on of impact forces from the end section into the connection section connected therewith can in an embodiment be further improved.

In an embodiment, the second side wall of the end section forms an angle with the vehicle transverse direction or axis which amounts to at least 10° and/or maximally 60°. Additionally or alternatively, the first side wall of the end section forms an angle with the vehicle transverse direction or axis in an embodiment which amounts to a maximum of 10°. Additionally or alternatively, an first side wall in the vehicle longitudinal direction and/or an second side wall in the vehicle longitudinal direction following thereon of a section integrally following the end section or of the connection section of the cross member connected to the end section with the vehicle transverse direction or axis forms an angle which amounts to maximally 10°. As a result, a transfer or introduction or passing-on of impact forces from the pillar onto or into the cross member can, in an embodiment, be further improved and thus, in a further development, in particular a loading of the side sill further reduced. Additionally or alternatively, in an embodiment, a production and/or connection of the cross member to the side sill can thereby be improved. Additionally or alternatively, installation space can thereby be made available in an embodiment.

In an embodiment, the end section has been or is produced from metal and/or cast or formed, in particular formed as a bent sheet metal part. As a result, a transfer or introduction or passing-on of impact forces from the pillar to or into the cross member can be further improved in an embodiment and thus in particular a loading of the side sill be further reduced in a further development. Additionally or alternatively, a production and/or connection of the cross member connection of the cross member to the side sill can thereby be improved in an embodiment.

In an embodiment, a connection section-side flange with at least one wing and preferably two wings is arranged on the end section in particular its upper cover wall, which is/are attached to the connection section, in particular in a firmly bonded manner, in particular welded, soldered and/or glued to the connection section. As a result, a transfer or introduction or passing-on of impact forces from the end into the connection section can be improved in an embodiment. Additionally or alternatively, a production of the cross member can thereby be improved in an embodiment.

In an embodiment, at least one elevation which is formed integrally therewith is arranged on the end section, in particular its upper cover wall, which supports itself on the connection section. As a result, a gap between end and connection section can be ensured in an embodiment, in particular a coating, in particular dip coating or the like be improved.

In an embodiment, the end section includes at least one face flange which is attached to the side sill in a firmly bonded manner, such welded, soldered and/or glued to the connection section. As a result, a transfer or introduction or passing-on of impact forces from the pillar onto or into the cross member can be further improved in an embodiment and thus in particular a loading of the side sill further reduced in a further development. Additionally or alternatively, a production and/or connection of the cross member to the side sill can thereby be improved in an embodiment.

In a further development, the end section includes a plurality of face flanges which are spaced from one another, which are attached to the side sill in a firmly bonded manner, in particular welded, soldered and/or glued to the connection section. As a result, a connection of the cross member to the side sill, in particular a side sill with a contoured profile, can be improved in an embodiment and/or a transfer or introduction or passing-on of impact forces from the pillar onto or into the cross member further improved and thus in particular a loading of the side sill further reduced in a further development.

In an embodiment, the cross member is attached at least at the end section, to a floor panel of the body via flanges and/or in a firmly bonded manner such as soldered and/or glued to the floor panel. As a result, a passing-on of impact forces from the cross member can be improved in an embodiment.

According to an embodiment of the present disclosure, the end section and the connection section are produced separately and subsequently connected to one another to form the cross member, and the end section attached to the side sill in a firmly bonded manner such as welded, soldered and/or glued to one another and the side sill in advance, in the process or subsequently. As a result, a production and/or connection of the cross member to the side sill can be improved in an embodiment.

BRIEF DESCRIPTION OF THE DRAWINGS

The present disclosure will hereinafter be described in conjunction with the following drawing figures, wherein like numerals denote like elements.

FIG. 1 shows a part of a motor vehicle body of a passenger car according to an embodiment of the present disclosure;

FIG. 2 is a cross member of the motor vehicle body, and

FIG. 3 is the cross member during the production of the motor vehicle body according to an embodiment of the present disclosure.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

FIG. 1 shows a part of a motor vehicle body of a passenger car according to an embodiment of the present disclosure with a left side-sill member or side sill 10, a B-pillar 20 arranged on the side sill 10, the cross sections of which, perpendicularly to a vehicle vertical direction (from the bottom up in FIG. 1) include a first or front side 21 in a vehicle longitudinal direction from a vehicle front to a vehicle rear (from the right to the left in FIG. 1) and a second or rear side 22 following in this vehicle longitudinal direction.

On the side sill 10, a cross member 300 is attached, which is adjacent to a pillar-next cross member 40 in the vehicle longitudinal direction. The cross member 300 includes a sill-side end section 310 (top in FIG. 2) and a connection section (320), which are separately produced and subsequently connected to one another to form the cross member 300, as indicated in FIG. 3.

The end section 310 includes a first or front side wall 311, in the vehicle longitudinal direction, and a flat following second or rear side wall 312 in the vehicle longitudinal direction, the connection section 320 accordingly a flat first or front side wall 321 in the vehicle longitudinal direction, and a flat, second or rear side wall 322 following in the vehicle longitudinal direction.

As is evident in particular from viewing FIGS. 1, 2 together, the front side wall 311 of the end section 310 and the front side wall 321 and rear side wall 322 of the connection section 322 run parallel to the vehicle transverse direction, while the second side wall 312 of the end section 310 is slanted against the vehicle transverse direction by an angle of approximately 40°.

For this reason, its distance in the vehicle longitudinal direction from the second side 22 of a sill-adjacent or lowermost (connection) cross section of the pillar 20 decreases linearly in the vehicle transverse direction towards the side sill 10, while a width of a cross section of the end section 310 that is perpendicularly to the vehicle transverse direction correspondingly increases linearly in the vehicle transverse direction towards the side sill 10.

As is evident in particular in FIG. 1, a flat upper cover wall 313 of the end section 310 is slanted upwards, so that its distance in the vehicle vertical direction from the pillar 11 decreases linearly in the vehicle transverse direction, while a height of a cross section of the end section 310 that is perpendicular to the vehicle transverse direction correspondingly increases linearly in the vehicle transverse direction towards the side sill 10. The end section 310 is, as indicated in FIG. 3, produced as a bent sheet metal part so that its cross sections each include a U-shaped profile perpendicularly to the vehicle transverse direction.

Following this, the connection section 320 is introduced and via wings 314 of a flange formed integrally with the end section 310 welded, soldered or glued to the same for supporting itself on the connection section 320 from the inside with a bead 315. In the state in which it is introduced into and connected to the connection section 320, the end section 310 engages over approximately ⅓ of its overall length in the connection section 320, as is evident in particular by viewing FIG. 1, 2 together. The end section 310 includes a plurality of face flanges 316 which are spaced from one another, which have been or are welded, soldered or glued to the side sill 10. In addition, end section 310 and also the connection section 320 have been or are welded, soldered or glued to a floor panel 50 via flanges.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A vehicle body comprising:
a side sill;
a pillar arranged on the side sill having a cross section with a first side in a vehicle longitudinal direction and a second following side in the vehicle longitudinal direction; and
a cross member attached to the side sill and having an end section and a connection section attached to the end section, the end section including a connection section-side opposite a sill-side end section and an upper cover wall that connects the connection section-side and the sill-side end section, the upper cover wall including a flange that extends outwardly from the connection-section side, the flange having at least one wing received wholly within the connection section to connect the end section to the connection section, wherein a height of the end section decreases in a vehicle transverse direction from the side sill to the connection section.

2. The motor vehicle body according to claim 1, wherein a width of the upper cover wall decreases in a vehicle longitudinal direction from the side sill to the connection section.

3. The motor vehicle body according to claim 2, wherein at least one of the width and the height of the cross section of the end section increases in the vehicle transverse direction.

4. The motor vehicle body according to claim 2, wherein the cross member is adjacent to a second cross member associated with a second pillar.

5. The motor vehicle body according to claim 2, wherein a cross section of at least one of the end section and connection section comprises a U-shaped profile oriented perpendicularly to the vehicle transverse direction.

6. The motor vehicle body according to claim 2, wherein the end section engages the connection section over a range between 20% and 80% of a length of the connection section.

7. The motor vehicle body according to claim 2, wherein the end section has a second side wall that forms an angle relative to the vehicle transverse direction in a range between 10° and 60°.

8. The motor vehicle body according to claim 7, wherein the end section has a first side wall that forms an angle relative to the vehicle transverse direction in a range between 0° and 10°.

9. The motor vehicle body according to claim 2, wherein the end section comprises a bent sheet metal part.

10. The motor vehicle body according to claim 2, wherein the end section comprises at least one face flange attached to the side sill.

11. The motor vehicle body according to claim 2 further comprising a floor panel, wherein the cross member is attached to the floor panel.

12. The motor vehicle body according to claim 2, wherein the upper cover wall of the end section includes an elevation that is in contact with the connection section.

13. A method for producing a motor vehicle body comprising:
providing a side sill and a pillar arranged on the side sill having a cross section with a first side in a vehicle longitudinal direction and a second following side in the vehicle longitudinal direction;
providing an end section having a second side wall following a first side wall of the end section in the vehicle longitudinal direction, the end section including connection section-side opposite a sill-side end section and an upper cover wall that connects the connection section-side and the sill-side end section, the upper cover wall including a flange that extends outwardly from the connection-section side and an elevation, the flange having at least one wing;
connecting the end section to the side sill;
providing a connection member; and
connecting the connection section to the end section such that the at least one wing is received wholly within the connection section and the elevation is in contact with the connection section;
wherein a height of the end section decreases in a vehicle transverse direction from side sill to the connection section.

14. The method according to claim 13,
wherein a width of the upper cover wall decreases in a vehicle longitudinal direction from the side sill to the connection section.

* * * * *